(12) United States Patent
Hector et al.

(10) Patent No.: US 10,018,229 B2
(45) Date of Patent: Jul. 10, 2018

(54) PROTECTION ARRANGEMENT FOR A UNIVERSAL JOINT SHAFT

(71) Applicant: GKN Walterscheid GmbH, Lohmar (DE)

(72) Inventors: Martin Hector, Siegburg (DE); Stefan Korber, Pulheim (DE); Wolfgang Adamek, Lohmar (DE)

(73) Assignee: GKN Walterscheid GmbH, Lohmar (DE)

( * ) Notice: Subject to any disclaimer, the term of this patent is extended or adjusted under 35 U.S.C. 154(b) by 182 days.

(21) Appl. No.: 15/140,845

(22) Filed: Apr. 28, 2016

(65) Prior Publication Data

US 2016/0319887 A1    Nov. 3, 2016

(30) Foreign Application Priority Data

Apr. 29, 2015    (DE) .................. 10 2015 106 697

(51) Int. Cl.
*F16D 3/84*    (2006.01)
*F16J 3/04*    (2006.01)
*F16P 1/02*    (2006.01)

(52) U.S. Cl.
CPC ............ *F16D 3/845* (2013.01); *F16D 3/84* (2013.01); *F16D 3/841* (2013.01); *F16J 3/042* (2013.01); *F16P 1/02* (2013.01)

(58) Field of Classification Search
CPC .. F16D 3/845; F16D 3/84; F16D 3/841; F16J 3/042; F16P 1/02

USPC ................................................ 464/171–175
See application file for complete search history.

(56) References Cited

U.S. PATENT DOCUMENTS

| 3,504,508 | A | 4/1970 | Bornzin |
| 4,324,533 | A | 4/1982 | Schroeder et al. |
| 4,696,660 | A | 9/1987 | Murphy et al. |
| 4,702,724 | A | 10/1987 | Vater |
| 6,123,622 | A | 9/2000 | Mikeska et al. |
| 8,202,171 | B2 * | 6/2012 | Hector .................... F16D 3/845 |
| | | | 464/171 |

FOREIGN PATENT DOCUMENTS

| DE | 1 947 882 | 5/1970 |
| DE | 200 10 202 | 12/2000 |
| DE | 10 2010 000 900 | 2/2011 |
| EP | 0 173 898 | 3/1986 |
| EP | 0 908 083 | 4/1999 |
| EP | 1 894 457 | 3/2008 |

(Continued)

*Primary Examiner* — Gregory Binda
(74) *Attorney, Agent, or Firm* — Bejin Bieneman PLC

(57) ABSTRACT

A universal joint shaft protection arrangement has a protection device (3) with at least one protection cone (11) and a projection pot (6). The protection pot (6) is attached to a stationary component. The protection cone (11) at least partially accommodates the protection pot in an axially overlapping manner. At least one driver (25, 25') is retained at the outside on the protection cone (11). The at least one driver (25, 25') radially engages a first recess (27, 27') in the protection cone (11) and a second recess (28, 28') in the protection pot (6) to support the protection cone (11) and the protection pot (6) in a circumferential direction against one another. The second recess (28, 28') is formed as a slot in the protection pot (6).

5 Claims, 4 Drawing Sheets

(56) References Cited

FOREIGN PATENT DOCUMENTS

| FR | 40683 | * | 8/1932 | |
|----|-------|---|--------|---|
| FR | 40863 | * | 8/1932 | ................... 464/171 |
| FR | 2 935 866 | | 3/2010 | |

* cited by examiner

PROTECTION ARRANGEMENT FOR A UNIVERSAL JOINT SHAFT

CROSS-REFERENCE TO RELATED APPLICATIONS

This application claims priority to German Patent Application No. 102015106697.1, filed Apr. 29, 2015. The entire disclosure of the above application is incorporated herein by reference.

FIELD

The disclosure relates to a protection arrangement for a universal joint shaft. The protection arrangement has a protection device that extends along a longitudinal axis. The protection arrangement rotatingly accommodates a universal joint shaft. The protection arrangement has at least one protection cone and a protection pot. The protection pot is to be attached to a stationary component. The protection cone accommodates the protection pot, at least partially, in an axially overlapping manner.

BACKGROUND

Protection arrangements are preferably used in connection with universal joint shafts that drive aggregates in agricultural implements. The universal joint shafts transmit torque from a main power train to an auxiliary drive or to individual aggregates. Universal joint shafts are also used to drive agricultural implements. The joint shaft is arranged between a tractor power take-off shaft and an implement drive input trunnion. Universal joint shafts comprise two universal joints and a connection shaft. The connection shaft connects the two universal joints. The connection shaft is telescopic along a longitudinal axis. The protection arrangement serves as a contact protection device for the universal shaft. The protection arrangement is accommodated in a supported manner on the universal shaft. The protection arrangement generally includes, for each universal joint, a protection cone and protection tube elements. The tube elements and cone are displaceable relative to each other along the longitudinal axis. One protection cone and a protection tube element are rotatably and axially non-displaceably retained by a bearing on one universal joint.

The protection device is retained, by being for example, connected via a chain to a fixing point of the implement. This is shown in DE 10 2010 000 900 A1. The universal joint shaft is rotatably supported, via bearings, in the protection arrangement. Thus, the protection device rotates with the shaft, especially in well known mountings, by slide bearings due to the drag torques. This is prevented by the use of the chain. In this case, the protection device can only rotate with the universal shaft until the chain is tensioned. Thus, further rotation of the protection device is prevented.

EP 0 908 083 B1 describes a protection arrangement of the above named type. In this case, one of the two protection cones, of the protection device, is fixingly connected at one axial end to a sleeve. This serves to stiffen the protection cone since the protection cone is formed as an elastic boot. The sleeve is connected, via screws, to a cone-like portion of the protection cone. The sleeve can be pushed axially outside onto the protection pot. The sleeve has circumferentially distributed inwardly projecting key projections to ensure a relatively non-rotating connection of the sleeve and thus of the protection cone and of the protection pot. Circumferentially distributed grooves, to engage the key projections, are correspondingly formed in the protection pot. The key projections and the grooves extend parallel to a longitudinal axis. Thus, the sleeve can be axially pushed onto the protection pot and carry out axial movements, relative to the protection pot, following articulation of the joint and deformation of the protection cone.

EP 0 173 898 B1 illustrated a protection device for a drive shaft of a front-wheel drive of an agricultural tractor. The protection device includes a protection tube that extends coaxially to the drive shaft and accommodates a cylindrical bearing sleeve that is supported on the shaft. The bearing sleeve is screwed onto a portion of the gearbox housing. The protection tube has at one end, facing the bearing sleeve, an open semi-circular alignment opening. The opening comes to rest in the area of a threaded bore of the bearing sleeve. A holding element, with a retaining disc, is screwed into the threaded bore to retain the protection tube axially and tangentially.

SUMMARY

It is an object of the present disclosure to provide a protection arrangement with a simple construction that is secured against rotation.

The object is achieved by a protection arrangement for a universal joint shaft that includes the following:

A protection device extends along a longitudinal axis. The protection device rotatingly accommodates a universal joint shaft and has at least one protection cone.

A protection pot is formed to attach to a stationary component.

The protection cone accommodates the protection pot, at least partially, in an axially overlapping manner.

The protection arrangement has at least one driver. The driver is retained at the outside on the protection cone.

The at least one driver radially engages in a first recess in the protection cone and in a second recess in the protection pot. The at least one driver supports the protection cone and the protection pot in a circumferential direction against one another. The second recess is formed as a slot in the protection pot.

An advantage of this embodiment is that the protection arrangement has few components and is designed in a simple manner. Furthermore, common tools can be used to produce the individual components of the protection arrangement. Subsequent alterations can be simply carried out in further production steps, as for example, forming the driver recesses. Further, replacement of currently used protection arrangements is also possible with the present embodiment.

The first recess is formed in the protection cone as a bore. The bore can be simply produced in the protection cone without the need to alter tools, for example injection molding tools, to produce the protection cone. Furthermore, corresponding bores can also be produced, in a retrofitting manner, in currently used protection cones.

The second recess is formed as a slot. The second recess can easily be produced in existing designs or can be added to currently used protection pots. Such slots are often already present in protection pots to operate the locking means of the joint fork of the universal shaft. The locking means connects the universal shaft to a drive trunnion or power take-off shaft.

The protection pot has a circumferentially extending wall with an edge formed on an axial end of the protection pot. The slot extends axially starting from the edge. Thus, during the assembly of the protection device on the protection pot, the drivers can be axially inserted into the slot. In this case, there is no axial support of the protection device relative to the protection pot, but only a support in the circumferential direction against rotation of the protection device relative to the protection pot.

The slot radially extends through the wall. Alternatively, it is also possible, that the slot does not fully cross the wall and is formed as a groove in an outer circumferential face of the wall.

The at least one driver is part of a driving ring retained on the protection cone. The driving ring can be formed as a closed ring with at least one radially projecting one driver. The driving ring can also have a C-like slot. Thus, the driving ring can be pushed in a radial direction along the longitudinal axis onto the protection cone. With this design, the ring should extend across more than 180 degrees around the circumference. Thus, the driving ring is securely held on the protection cone.

The protection cone is formed at least partially as a convoluted boot. In this case the driving ring can be accommodated between two axially adjacent folds of the boot. Thus, the driving ring is secured on the cone in an axial direction in the first recess as well as by the two folds. The driving ring is retained in the circumferential direction by the at least one driver engaged in the first recess of the protection cone. Thus, the driving ring can be pre-assembled on the protection cone during production.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
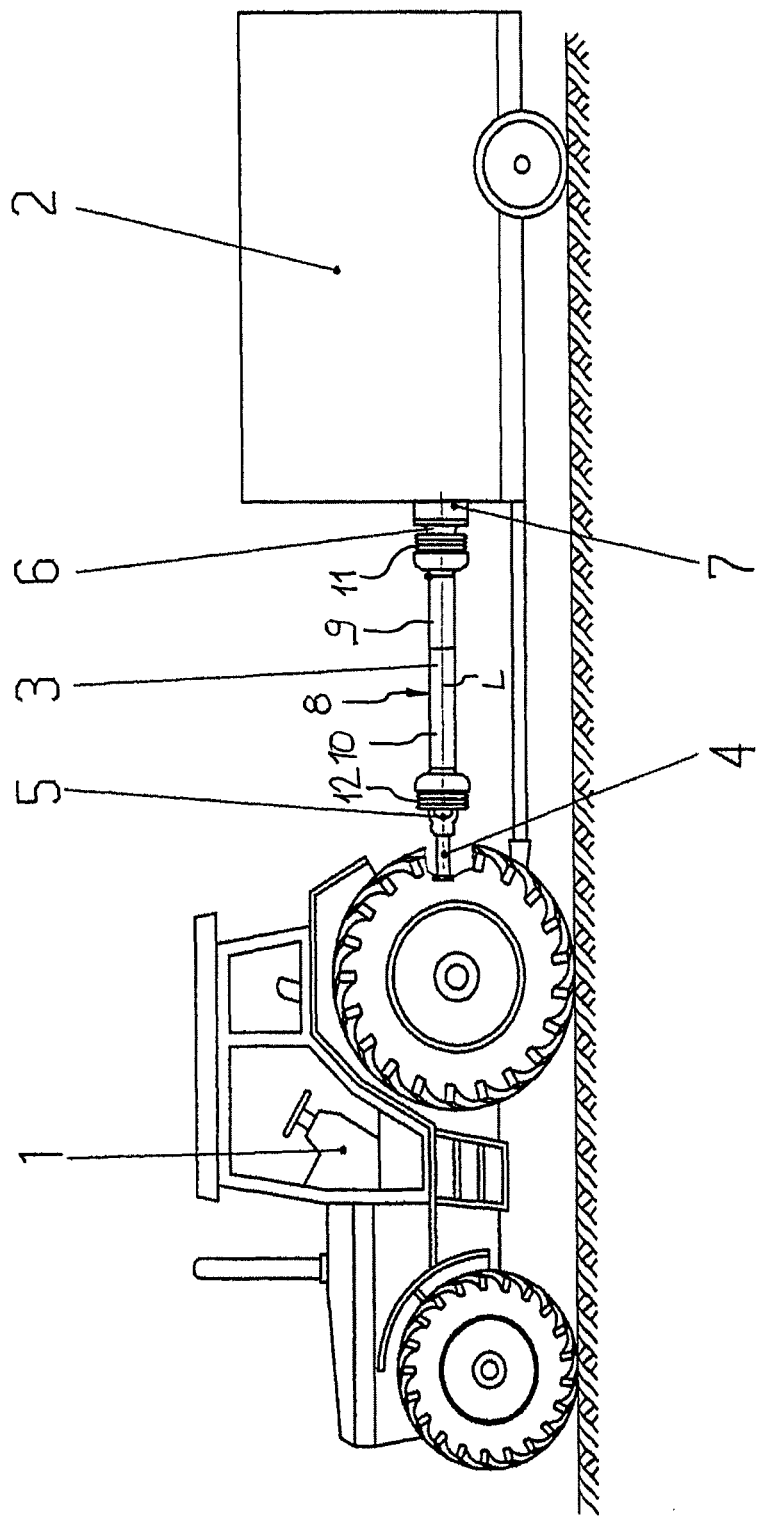
FIG. 1 is an elevation view of a protection arrangement on a tractor with an attached implement driven, via a universal joint shaft.

FIG. 1 illustrates a tractor 1 with an attached implement 2. The implement 2 is driven by a universal joint shaft 5, with a protection device 3, via the power take-off shaft 4 of the tractor 1. The universal joint shaft 5 is pushed onto the power take-off shaft 4 and is connected to it. On the side of the implement, the universal joint shaft 5 is also, drive-wise, connected to a driving element of a gearbox 7.

The protection device 3 has a protection tube 8 with a first protection tube element 9 and a second protection tube element 10. The protection tube 8 telescopically extends along a longitudinal axis L. The first protection tube element 9 is connected to an implement-sided protection cone 11.

The second protection cone element 10 is connected to a tractor-sided protection cone 12. The two protection cones 11, 12 enclose, respectively, one universal joint of the universal joint shaft 5.

As described in the following, the protection device 3 is rotatably supported on the universal joint shaft 5. The first protection tube element 9 does not rotate with the universal joint shaft 5. The implement-sided protection cone 11 is non-rotatably connected to a protection pot 6. The protection pot 6 is attached on the gearbox 7. Alternatively or additionally, the tractor-sided protection cone 12 can be non-rotationally supported, via a protection pot, on a component of the tractor 1. When the two protection tube elements 9, 10 are not non-rotationally connected to each other, the support of the tractor-side protection cone 12 and of the implement-side protection cone 11 is necessary relative to the stationary components of the tractor 1 or the implement 2.

Figure 2:
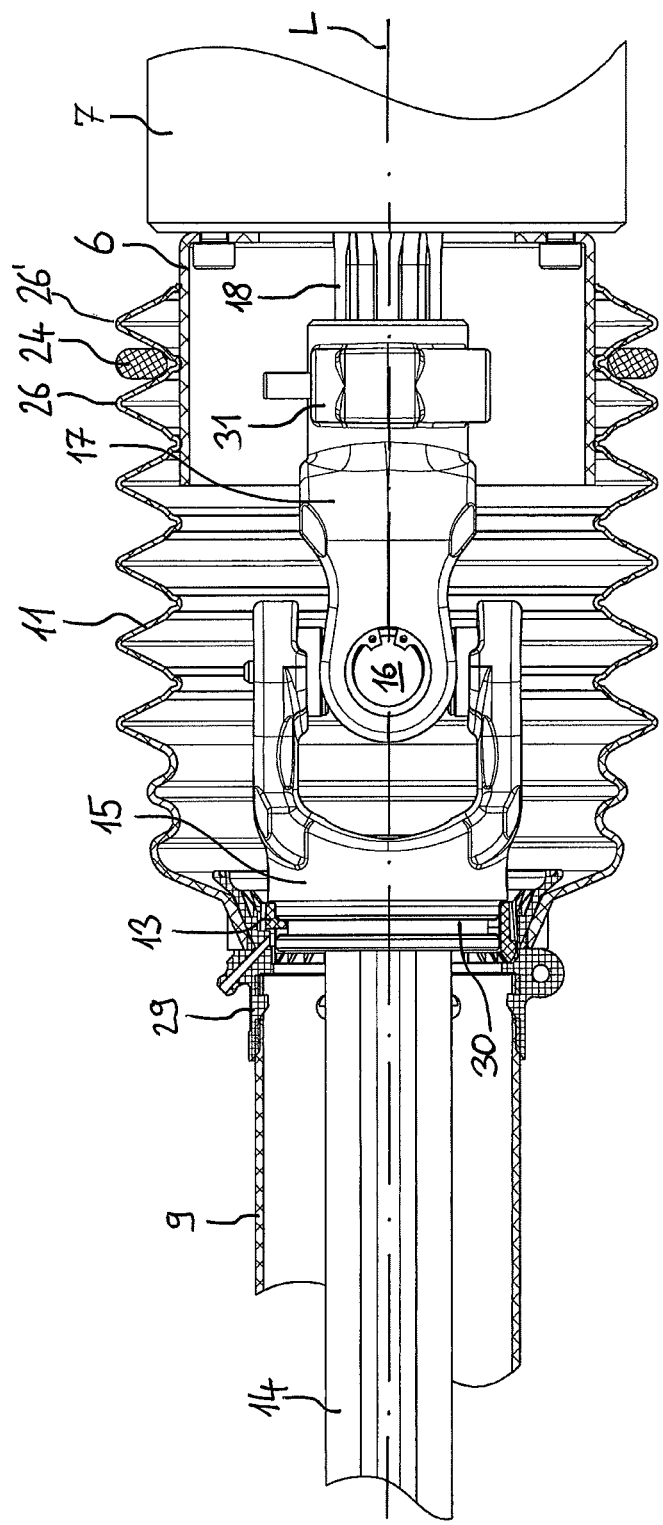
FIG. 2 is a partial longitudinal sectional view of the protection arrangement and the universal joint shaft of FIG. 1.

FIG. 2 shows a longitudinal sectional view of the universal joint shaft 5 with a protection device 3 in the area of the implement-side protection cone 11. The first protection tube element 9 is connected, via an adaptor ring 29, to a slide ring 13. The slide ring 13 is rotationally supported by an engagement in a recess 30 in an inner yoke 15 connected to a tube 14 of the universal joint shaft 5. The inner yoke 15 is drive-wise connected, via a cross kit 16, to an outer yoke 17 of the universal joint shaft 5, in a generally known manner. The outer yoke 17 is connected non-rotationally, via a locking mechanism 31, to a drive shaft 18, for example, of a gearbox 7 and to a housing part.

Figure 3:
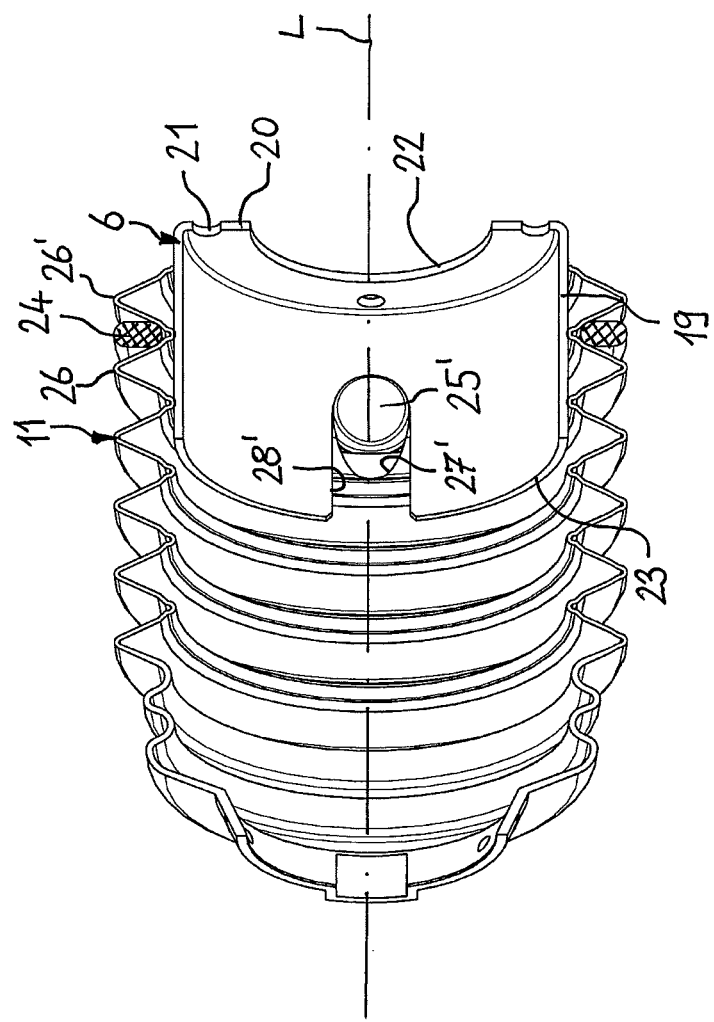
FIG. 3 is a partial longitudinal sectional view of the protection arrangement without the universal joint shaft of FIG. 2.

The implement-side protection cone 11 is connected non-rotationally to the slide ring 13. During rotation of the universal joint shaft 5, the first protection tube element 9 would also rotate due to drag torques generated via the slide ring 13 onto the protection device 3. In order to prevent a rotation of the protection tube element 9 the implement-side protection cone 11 is connected non-rotationally to the protection pot 6. The protection pot 6 is formed such that it can be connected, non-rotationally, to a housing of the gearbox 7. The protection pot 6 has, as visible in FIG. 3, a wall 19, circumferentially extending coaxially to the longitudinal axis L. The wall 19 is cylindrically formed in the present case. The wall 9 can, however, have also a conical or other shape. The protection pot 6 has an attachment flange 20 with attachment bores 21 at an implemented-side end. The protection pot 6, via the flange 20 and bores 21, is connected to a housing of the gearbox 7 or a different housing part. The attachment flange 20 forms a central through opening 22. The drive shaft 18 of the gearbox 7 is passed through the opening 22.

On the end, facing away from the attachment flange 20, the wall 19 forms an edge 23. The edge 23 forms an opening where the outer yoke 11 of the universal joint shaft 5 can be inserted.

Figure 4:
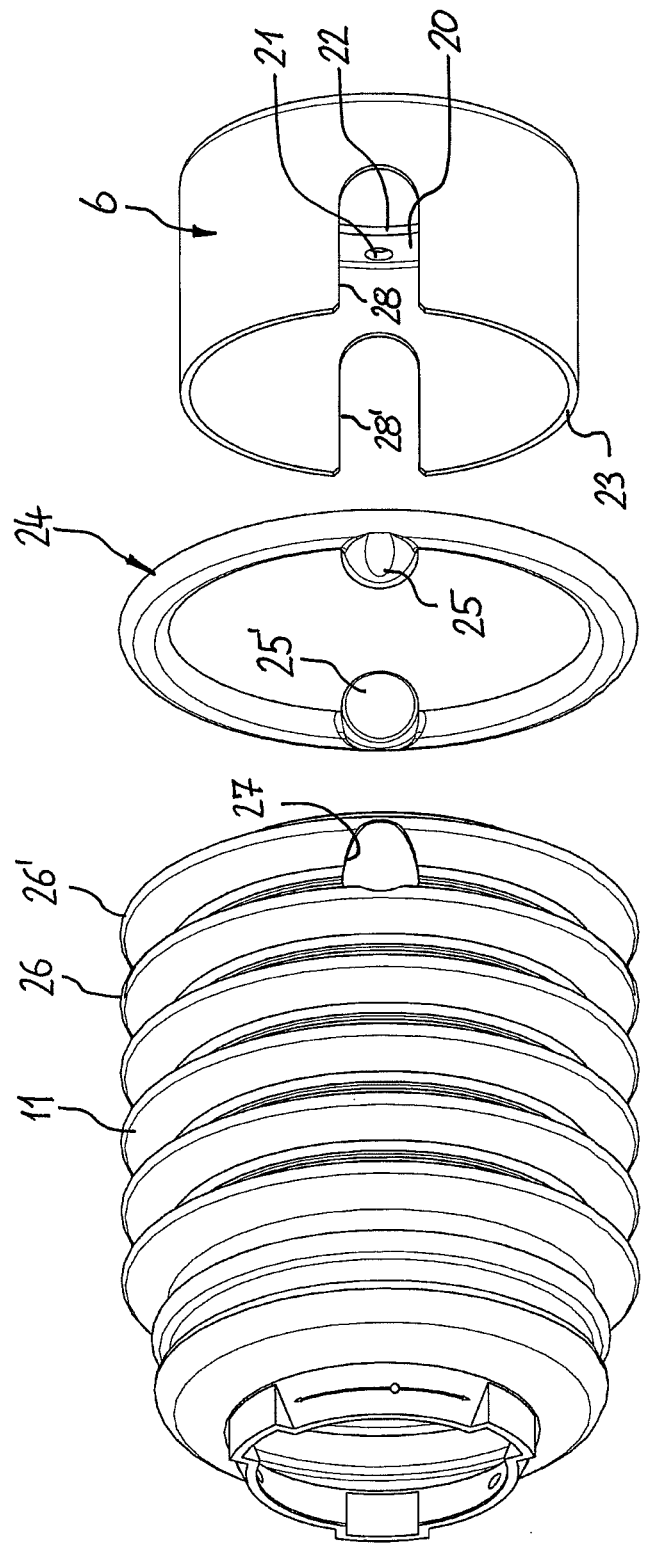
FIG. 4 is an exploded perspective view of components of the protection arrangement.

A driving ring 24 is provided for the non-rotational connection. FIG. 4 illustrates an exploded representation of the implement-side protection cone 11, the driving ring 24 and the protection pot 6. It is obvious that the driving ring 24 is closed around the circumference and has two radially inwardly projecting drivers 25, 25'.

The implement-side protection cone 11 is formed in the shape of a convoluted boot with multitude folds 26, 26' arranged axially next to each other. The folds 26, 26' are arranged circumferentially around the longitudinal axis L. The driving ring 24 is accommodated between two directly neighboring or adjacent folds 26, 26'. Thus, the driving ring 24 is held axially between the two folds 26, 26'.

First recesses 27, 27' are provided in the implement-side protection cone 11. The recesses 27, 27' extend radially through the implement-side protection cone 11. The first recesses 27, 27' are formed as bores and are arranged between the two folds 26, 26'. The driving ring 24 is accommodated between the two folds 26, 26'. The drivers 25, 25' project radially inwards, in this case, from the outside through one of the recesses 27, 27', respectively.

Two second recesses 28, 28' are provided in the protection pot 6. The second recesses 28, 28' are formed as slots in the wall 19. The slots extend axially from the edge 23 of the wall 19 toward the flange 20. In the mounted condition, the drivers 25, 25' project radially inward into the second recesses 28, 28'. Thus, the drivers 25, 25' are supported in the circumferential direction on the protection pot 6. Furthermore, the implement-side protection cone 11 is supported in a circumferential direction on the drivers 25, 25'. Thus, the implement-side protection cone 11 and, thus, the entire protection device 3 is supported in a non-rotational manner relative to the protection pot 6. Drag torques, which are introduced by the universal joint shaft 5 via the slide ring 13 into the protection device 3, are thus supported via the drivers 25, 25' and the protection pot 6.

The second recesses 28, 28' extend from the edge 23 of the wall 19 in an axial direction. The protection cone 11, with the assembled driving ring 24, can simply be pushed onto the protection pot 6. The drivers 25, 25' axially enter into the slot-like second recesses 28, 28'. Thus, the protection cone 11 protects the assembly of the universal joint shafts on the gearbox 7 or on a housing.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A protection arrangement for a universal joint shaft comprising:
   a protection device extending along a longitudinal axis for accommodating a universal joint shaft, the protection device including at least one protection cone;
   a protection pot to be attached to a stationary component;
   the protection cone at least partially accommodates the protection pot in an axially overlapping manner;
   the protection arrangement has at least one driver, wherein the at least one driver is retained on the outside of the protection cone and is part of a driving ring retained on the protection cone;
   the at least one driver is radially engaged in a first recess in the protection cone and in a second recess in the protection pot, the at least one driver supports the protection cone and the protection pot in a circumferential direction against one another;
   the second recess is formed as a slot in the protection pot.

2. The protection arrangement according to claim 1, wherein the first recess is formed as a bore in the protection cone.

3. The protection arrangement according to claim 1, wherein the protection pot has a circumferentially extending wall with an edge formed at one axial end of the protection pot and the second recess, in a form of a slot, extends axially starting from the edge.

4. The protection arrangement according to claim 3, wherein the second recess, formed as the slot, radially extends through the wall.

5. The protection arrangement according to claim 1, wherein the protection cone is formed at least partially as a convoluted boot and the driving ring is accommodated between two axially adjacent folds of the convoluted boot.

* * * * *